United States Patent [19]
Schmidt

[11] Patent Number: 5,954,520
[45] Date of Patent: Sep. 21, 1999

[54] MAGNETIC COUPLER

[76] Inventor: William P. Schmidt, 21000 Woodruff, Rockwood, Mich.

[21] Appl. No.: 08/770,735

[22] Filed: Dec. 19, 1996

[51] Int. Cl.⁶ ................................................... H01R 11/30
[52] U.S. Cl. ............................ 439/39; 439/289; 439/680
[58] Field of Search ................................. 439/39, 38, 40, 439/680, 271, 289

[56] References Cited

U.S. PATENT DOCUMENTS

| | | |
|---|---|---|
| 2,226,287 | 12/1940 | Miller . |
| 2,680,234 | 6/1954 | Kissick ..................... 439/289 |
| 3,181,895 | 5/1965 | Cator . |
| 3,245,028 | 4/1966 | Badger ..................... 439/289 |
| 3,431,428 | 3/1969 | Van Valer ................. 439/39 |
| 3,521,216 | 7/1970 | Tolegian ................... 439/39 |
| 3,628,811 | 12/1971 | Rivers et al. . |
| 4,166,663 | 9/1979 | Walker et al. ............ 439/271 |
| 5,401,175 | 3/1995 | Guimond et al. .......... 439/39 |

Primary Examiner—Paula Bradley
Assistant Examiner—Katrina Davis
Attorney, Agent, or Firm—Weintraub & Brady, P.C.

[57] ABSTRACT

A magnetic coupler for use in semi-trailer rigs includes a contact member and a receiving member, the contact member having at least one biased contact which seats in a seat formed in the receiving member, the seat having an electrical conductor disposed therewithin. A member has a peripheral ring of opposite magnetic polarities in order to ensure magnetic attraction therebetween. Cooperating projection and keyway may be formed on the peripheral rings to assure proper alignment between the contact member and the receiving member.

14 Claims, 2 Drawing Sheets

MAGNETIC COUPLER

BACKGROUND OF THE INVENTION

1. Field of the Invention

The present invention pertains to magnetic couplers. More particularly, the present invention pertains to magnetic couplers having separable components. Even more particularly, the present invention concerns magnetic couplers for effecting electrical connection between tractor-trailer service lines.

2. Prior Art

The utilization and disposition of magnetic couplings for effecting electrical connection between separate components is well known in the prior art. See, inter alia, U.S. Pat. No. 3,181,895. Likewise, the use of magnetic couplings for effecting interengagment between vehicular components is, also, known. See, inter alia, U.S. Pat. No. 2,226,287.

Furthermore, the utilization of magnetic coupling devices for interconnecting the electrical service lines of tractor-trailer combinations is also known in the art. See, for instance, U.S. Pat. No. 3,628,211.

With particular attention to tractor-trailer assemblies, as is known to those skilled in the art to which the present invention pertains, the connection of the electrical service lines between the tractor and trailer or semi-trailer rig creates difficulties when accidental or unanticipated separation is encountered. Oftentimes, the coupler is so situated that there is actual severance of the service lines. Heretofore, there has not been provided in the prior art, a coupler which easily separates into separable components without deleteriously affecting the actual service lines which are interconnected via the coupler. As is detailed hereinafter, the present invention overcomes the problems in the prior art noted herein.

SUMMARY OF THE INVENTION

In accordance with the present invention, there is provided a magnetic coupler which, generally, comprises:

(a) a contact member having a central body portion and a peripheral ring, the body member having at least one contact element, the peripheral ring comprising a magnetic material of a first polarity, (b) a receiving member having a central body portion and a peripheral ring, the central body portion including means for receiving the contact element to effect electrical communication therebetween, the peripheral ring comprising a magnetic material of an opposite polarity to that of the first peripheral ring, and (c) means for orienting the connecting member and the receiving member.

More particularly, the contact member has a central body portion which includes a plurality of contact elements or contacts which are in electrical communication with an electric service line. Biasing means, such as a spring or the like urges the contact into engagement with the means for receiving the contact.

The receiving member has at least one receptacle formed therein which receives or seats therein the at least one contact element to effect electrical contact therebetween.

One of either the first or second members or components includes a keyway formed in its peripheral ring and the opposite member or other member has a key disposed on its peripheral ring which projects into the keyway. In this way, proper orientation is effected between the members. In the event of unanticipated or anticipated separation between the two elements it is easily affected without unwarranted disruption or break to the service lines.

For a more complete understanding of the present invention, reference is made to the following detailed description and accompanying drawing. In the drawing, like reference characters refer to like parts throughout the several views in which:

DESCRIPTION OF THE PREFERRED EMBODIMENT

Figure 1:
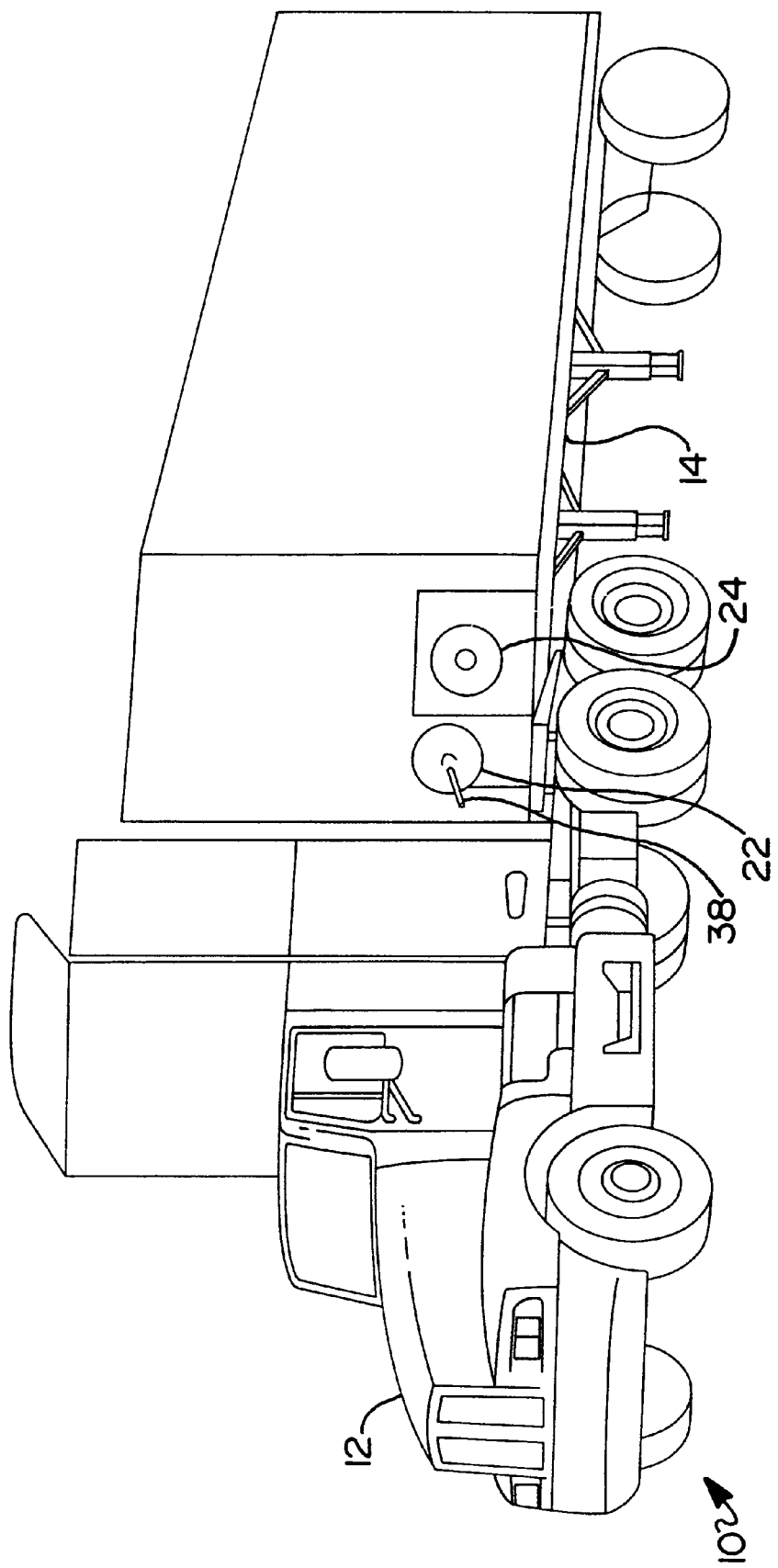
FIG. 1 is an environmental view showing the disposition of the coupler hereof on a tractor-trailer assembly.
Figure 2:
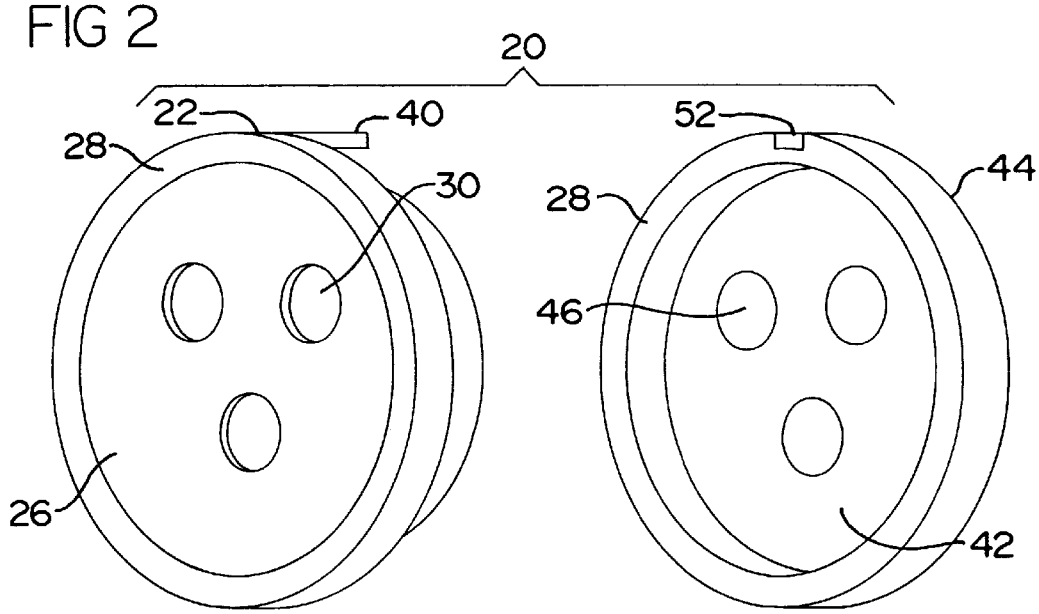
FIG. 2 is a perspective view of the coupler hereof.
Figure 3:
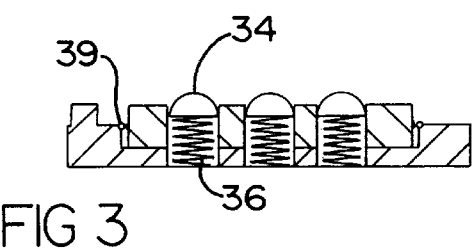
FIG. 3 is a cross-sectional view of the contact element.
Figure 4:
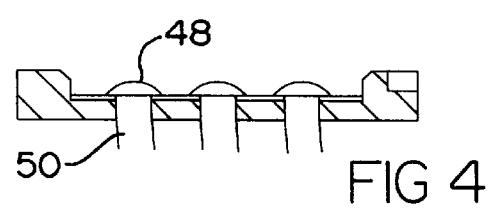
FIG. 4 is a cross-sectional view of the receiver element of the coupler hereof.
Figure 5:
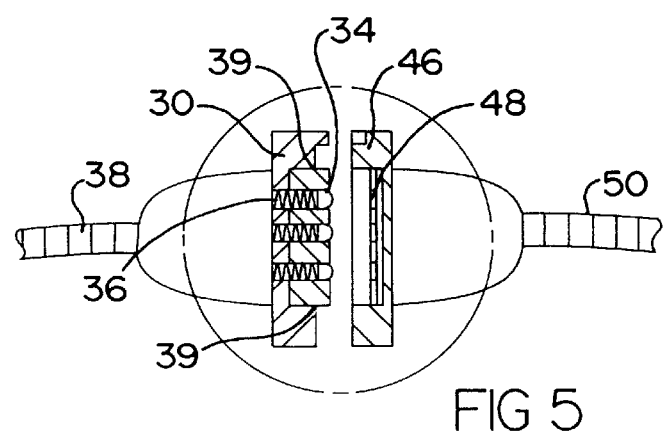
FIG. 5 is a side elevational view, partly in cross section, showing the interengagement between the separable components.

Now, and with reference to the drawing there is depicted therein a preferred embodiment of the present invention. As noted hereinabove the present invention has particularly utility with respect to effecting coupling between the service lines of a semi-trailer rig, generally, denoted at 10. The rig, typically, includes a cab 12 and a trailer 14 which are interconnected via a king pin and fifth wheel arrangement (not shown). Typically, the service lines for the trailer of the rig are connected through any suitable device to service lines extending from the cab. Such service lines are electrical lines which are used to power lighting systems, refrigeration systems, etc.

In accordance with the present invention, interconnection between the service lines for the trailer and the cab are effected through a coupling device, generally, denoted at 20. The coupling device 20 hereof, generally, comprises first and second separable components or members 22 and 24, respectively. For purposes of clarity, the separable component 22 will be referred to as the contact component or member and the second component will be referred to as the receiving component or member.

As shown in the drawing, the contact component 22, generally, comprises a central body portion 26 and a peripheral ring 28. The central body portion is formed from any suitable non-electrically conducting or conductive material, preferably, a ceramic, di-electric or like material. At least one partial bore 30 is formed in the central body portion. Preferably, a plurality of bores 30 is formed in the central body portion 26. Disposed within each bore 30 and extending and projecting outwardly therefrom is an electrically conductive element or contact 34. Means for biasing the contact out of the bore, such as a spring 36 is associated with each contact 34. The spring 36 is disposed within the bore 30 and normally biases the contact element 34 outwardly therefrom, as such. The contact is secured to the spring element by any suitable means. The central body portion is directly connected to an electrical service line 38, in turn, which is connected to the electrical operating system of the vehicle.

The peripheral ring 28 circumferentially envelops and surrounds the central body portion as shown. The ring 28 is separated from the central body portion. An O-ring seal 39 or the like is interposed the peripheral ring and the central body and acts as a seal to prevent moisture from getting therepast to ground out the system. The O-ring seal may be formed from any suitable material, such as rubber, Neoprene or the like. The peripheral ring is formed from a magnetic material such as a metal or, alternatively, may be formed from a non-conducting material having magnetic particles distributed throughout. In either event, though, the magnetic field imparted to the ring 28 is of a first plurality.

The ring 28 is provided with a key 40 which is integrally formed therewith and projects outwardly therefrom. As discussed hereinbelow, the key cooperates with a keyway, formed in the second component to ensure proper orientation between the separable components.

Although not critical to the practice of the present invention, it is preferred that the contact member be associated with the cab 12 of the rig 10.

The receiver component or member 24 is secured to the trailer 14 by any suitable means (not shown). The receiver, generally, comprises a central body portion 42 and a peripheral ring 44. The central body portion 42 is formed from any suitable non-conductive material such as a ceramic or di-electric like material in similar fashion to the central body portion 26. The central body portion 42 has at least one and, preferably, a plurality of seats or receptacles 46 formed therein which are dimensioned to receive a corresponding contact of the contact member.

Disposed within each seat is a conductive element 48 which is in electrical communication with a trailer service line 50 which corresponds to the service line to which the associated contact is connected.

The peripheral ring 44 of the receiving member 24 is formed from a magnetic material, in the same fashion as that of the ring 28 of the contact component 22. Herein, though, the polarity of the ring 44 is opposite of that of the ring 28 such that there is a magnetic attraction therebetween when brought into mating engagement.

A slot 52 is formed in the ring 44 and which defines a keyway and which receives therewithin the projection or key 40 provided on the ring 28 of the contact member. Cooperation between the projection or key and the keyway ensures proper orientation between the contact member and the receiving member such the contacts will properly align and seat in their associated receptacles.

Also, a sealing member, such as an O-ring seal may be seated about the periphery of the central body portion in similar fashion to that of the O-ring 39.

In use, when the two members 22 and 24 are brought into mating engagement, the opposite polarity peripheral rings will ensure mating engagement therebetween. Upon mating engagement, the at least one contact will project into and be received in the seat of the receiving member to, thus, ensure electrical contact therebetween.

Upon separation of the two members, whether desired or unexpected, the ring of the contact member will be separated from the ring of the receiving member. Separation therebetween will cause the contact member to work against the bias of the biasing means to thereby electrically disconnect the contact member from the receiving member. In the event of unexpected separation, such as by an accident, jackknifing, or the like the overcoming of the magnetic field between the peripheral rings will cause the separation. This, preserves the integrity of the service lines which could otherwise become destroyed where plugs and receptacles or sockets are used.

Having, thus, described the invention what is claimed is:

1. A magnetic coupler comprising:
   (a) a contact member, the contact member including:
      (1) a central body portion, the central body portion being a substantially planar member;
      (2) at least one contact element, the at least one contact element being disposed in the central body portion;
      (3) a peripheral magnetic ring, the peripheral magnetic ring being disposed around the periphery of the central body portion; and
      (4) a separate sealing member, the separate sealing member interposing the peripheral ring and the central body portion;
   (b) a receiving member, the receiving member including:
      (1) a central body portion having a recess,
      (2) an at least one means for receiving the at least one contact element, the at least one means for receiving the at least one contact element being provided in the recess of the central body portion;
      (3) a peripheral magnetic ring of opposite polarity to the peripheral magnetic ring of the contact member, the peripheral magnetic ring being disposed around the periphery of the central body portion; and
      (4) a separate sealing member, the separate sealing member being disposed about the periphery of the central body portion; and
   wherein the peripheral magnetic ring of the contact member is of a first polarity and the peripheral magnetic ring of the receiving member is of a second polarity, further wherein the peripheral magnetic rings directly engage each other when coupled.

2. The magnetic coupler of claim 1 which further comprises:
   (a) means for normally biasing the at least one contact element with the means for receiving.

3. The magnetic coupler of claim 2 wherein:
   (a) the central body portion of the contact member has a plurality of apertures formed therein, the coupler further comprising:
   (b) a contact element associated with each of the apertures, the contact element projecting through the apertures;
   wherein there is an equal number of means for receiving formed in the receiving member for the number of contacts in the contact member; and
   wherein there is an equal number of means for normally biasing each contact element for the number of contacts in the contact member.

4. The magnetic coupler of claim 1 which further comprises:
   (a) means for aligning the contact member and the receiving member.

5. The magnetic coupler of claim 4 which further comprises:
   (a) a projection disposed on one of the peripheral rings and a keyway formed on the other peripheral ring, the projection being insertable into the keyway to assure proper alignment between the contact member and the receiving member.

6. The magnetic coupler of claim 1 which further comprises:
   (a) an electrical conductor disposed within the recess; and
   wherein upon the contact member being disposed within the recess, electrical communication is established between the contact member and the receiving member.

7. A magnetic coupler comprising:
   (a) a contact member, the contact member including:
      (1) a central body portion, the central body portion being a substantially planar member;

(2) at least one contact element disposed in the central body portion;
(3) a peripheral magnetic ring, the magnetic ring being disposed around the periphery of the central body portion, and (b) a receiving member, the receiving member including:
(1) a central body portion;
(2) at least one means for receiving the at least one contact element, the at least one means for receiving the at least one contact element being provided in the recess of the central body;
(3) a magnetic peripheral ring of opposite polarity to the magnetic peripheral ring of the contact member, the magnetic peripheral ring being disposed around the periphery of the central body; and (c) an aligning device for aligning the contact member and the receiving member, the aligning device comprising:
at least one projection, the at least one projection disposed on one of the peripheral rings;
at least one keyway, the at least one keyway formed in the peripheral ring opposite that of the ring having the at least one projection disposed thereon to receive the projection for substantial alignment between the contact member and the receiving member.

8. The magnetic coupler of claim 7 which further comprises:
(a) means for normally biasing the at least one contact element into contact with the means for receiving.

9. The magnetic coupler of claim 8, wherein the central body portion of the contact member has a plurality of apertures formed therein, the central body having the at least one contact element associated with at least one of the apertures, the contact members projecting through the apertures.

10. The magnetic coupler of claim 7 which further comprises:
(a) an electrical conductor disposed within the recess, wherein upon the contact member being disposed within the recess, electrical communication is established between the contact member and the receiving member.

11. The magnetic coupler of claim 7, wherein the peripheral magnetic ring of the contact member is of a first polarity.

12. The magnetic coupler of claim 7, wherein the peripheral magnetic ring of the receiving member is of a second polarity.

13. A magnetic coupler comprising:
(a) a contact member, the contact member including:
(1) a central body portion, the central body portion being a substantially planar member;
(2) at least one contact element, the at least one contact element being disposed in the central body portion;
(3) a peripheral magnetic ring, the peripheral magnetic ring being disposed around the periphery of the central body portion; and
(4) a separate sealing member, the separate sealing member interposing the peripheral ring and the central body portion;

(b) a receiving member, the receiving member including:
(1) a central body portion;
(2) at least one means for receiving the at least one contact element, the at least one means for receiving the at least one contact element being provided in the recess of the central body portion;
(3) a peripheral magnetic ring of opposite polarity to the peripheral magnetic ring of the contact member, the peripheral magnetic ring being disposed around the periphery of the central body portion; and
(4) a sealing member, the sealing member being disposed about the periphery of the central body portion; and (c) means for aligning the contact member and the receiving member; wherein the peripheral magnetic rings directly engage each other when coupled.

14. The magnetic coupler of claim 13 wherein the means for aligning comprises:
a projection disposed on one of the peripheral rings and a keyway formed on the other peripheral ring, the projection being insertable into the keyway to assure proper alignment between the contact member and the receiving member.

* * * * *